United States Patent
Bachmann et al.

(10) Patent No.: US 9,157,538 B2
(45) Date of Patent: Oct. 13, 2015

(54) METHOD OF OPERATING A VALVE

(71) Applicant: VAT Holding AG, Seelistrasse (CH)

(72) Inventors: Christoph Bachmann, Sennwald (CH); Florian Ehrne, Frumsen (CH)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 14/547,655

(22) Filed: Nov. 19, 2014

(65) Prior Publication Data

US 2015/0136236 A1     May 21, 2015

(30) Foreign Application Priority Data

Nov. 21, 2013   (EP) ..................................... 13005463

(51) Int. Cl.
| | |
|---|---|
| *F16K 15/06* | (2006.01) |
| *F16K 3/02* | (2006.01) |
| *F16K 51/02* | (2006.01) |
| *F16K 11/18* | (2006.01) |

(52) U.S. Cl.
CPC ................. *F16K 15/06* (2013.01); *F16K 3/029* (2013.01); *F16K 11/18* (2013.01); *F16K 51/02* (2013.01); *Y10T 137/0379* (2015.04)

(58) Field of Classification Search
CPC ......... F16K 15/06; F16K 51/02; F16K 11/18; F16K 3/029; Y10T 137/0379
USPC ...................... 137/12; 251/12, 14, 28–29, 82, 251/326–329
See application file for complete search history.

(56) References Cited

U.S. PATENT DOCUMENTS

| | | | |
|---|---|---|---|
| 4,052,036 A | 10/1977 | Schertler | |
| 5,087,017 A * | 2/1992 | Sawa et al. ................... | 251/175 |
| 5,170,990 A | 12/1992 | Kamiya et al. | |
| 6,074,202 A | 6/2000 | Yagi et al. | |
| 6,561,483 B2 * | 5/2003 | Nakagawa ................... | 251/175 |
| 6,561,484 B2 * | 5/2003 | Nakagawa et al. ........... | 251/175 |
| 6,854,708 B2 * | 2/2005 | Contin et al. ................ | 251/167 |
| 7,131,451 B2 * | 11/2006 | Nugent et al. ................. | 137/12 |
| 7,413,162 B2 * | 8/2008 | Geiser .......................... | 251/301 |
| 7,494,107 B2 * | 2/2009 | Sheydayi et al. ........... | 251/63.5 |
| 7,743,790 B2 | 6/2010 | Howard | |
| 8,348,234 B2 | 1/2013 | Duelli | |
| 2006/0034673 A1 | 2/2006 | Choi et al. | |
| 2007/0051314 A1 | 3/2007 | Choi et al. | |

(Continued)

FOREIGN PATENT DOCUMENTS

| | | |
|---|---|---|
| JP | 04162709 | 6/1992 |
| JP | 04208527 | 7/1992 |

(Continued)

*Primary Examiner* — John Bastianelli
(74) *Attorney, Agent, or Firm* — Volpe and Koenig. P.C.

(57) ABSTRACT

Method of operating a valve (1) which connects openings (2, 3) of at least two chambers (4, 5) to one another and, for closing the openings (2, 3) of each of the chambers (4, 5), has at least one dedicated closure member (6, 7), wherein for opening one of the openings (2, 3), the chamber (4, 5) assigned to said opening (2, 3) has generated in it a positive pressure which is higher than a current pressure in the valve-housing interior (8), wherein, by virtue of this positive pressure, the closure member (6, 7) assigned to said opening is raised up from the valve seat (10, 11) assigned to said opening (2, 3) and then, through this opening (2, 3), pressure equalization is carried out between the valve-housing interior (8) and the chamber (4, 5) assigned to said opening (2, 3). (FIG. 1)

9 Claims, 4 Drawing Sheets

(56) References Cited

U.S. PATENT DOCUMENTS

| | | |
|---|---|---|
| 2008/0101893 A1 | 5/2008 | Tanzawa |
| 2008/0210307 A1* | 9/2008 | Matsumoto et al. ............ 251/12 |
| 2010/0051111 A1* | 3/2010 | Matsumoto et al. ............ 137/13 |
| 2014/0230930 A1 | 8/2014 | Kwang |

FOREIGN PATENT DOCUMENTS

| | | |
|---|---|---|
| JP | 04276074 | 10/1992 |
| JP | 06203782 | 7/1994 |
| JP | 11186363 | 7/1999 |
| JP | H11186363 | 7/1999 |
| JP | 2006310561 | 11/2006 |
| JP | 2010040623 | 2/2010 |
| JP | 2011505528 | 2/2011 |
| JP | 2011512639 | 4/2011 |
| KR | 1020090118088 | 11/2009 |
| KR | 101171990 | 8/2012 |
| KR | 1020120134537 | 12/2012 |
| WO | 9108412 | 6/1991 |
| WO | 2010115917 A1 | 10/2010 |

\* cited by examiner

METHOD OF OPERATING A VALVE

INCORPORATION BY REFERENCE

The following documents are incorporated herein by reference as if fully set forth: European Patent Application No. 13005463.8, filed Nov. 21, 2013.

BACKGROUND

The present invention relates to a method of operating a valve, in particular vacuum valve, which connects openings of at least two chambers to one another and, for closing the openings of each of the chambers, has at least one dedicated closure member, wherein the closure members, for closing the openings in a closed position in a housing interior of the valve, are pressed, by at least one longitudinal drive of the valve, against valve seats, assigned to each of the openings.

The valves of the aforementioned type used for methods of the type in question are arranged between at least two chambers, in order to be able to close openings in the chambers. In the open state of the openings, workpieces, components and the like can be introduced, via the valve, into the interior of the chambers or can be transferred, via the valve, between the two chambers. The chambers may be process chambers, in which workpieces, components or the like are subjected to a treatment, cleaning, or production process or the like. The chambers, however, may also be so-called transfer chambers, which serve essentially as a connection between process chambers or as pre-chambers for process chambers. Valves of the aforementioned type are, in particular, also used in so-called vacuum technology, where workpieces, components or other articles are subjected to specific processing in a certain atmosphere, and/or under certain pressure conditions, within a chamber. The valves and also the chambers may end up having process residues and the like deposited in them, on account of the respective gas composition and/or processing steps, as a result of certain processes. Moreover, it is usually necessary for the valves to be regularly maintained.

For example, in preparation for such maintaining or cleaning operations, it is often necessary in the first instance to carry out pressure equalization between at least one of the chambers and the valve-housing interior.

KR 10-1171990 B1 discloses realizing such pressure equalization via additional bypass lines laid between the chambers and the valve-housing interior.

SUMMARY

It is an object of the invention to provide an alternative way of carrying out pressure equalization for methods of the type in question.

For this purpose, it is provided according to the invention that for opening one of the openings, the chamber assigned to said opening has generated in it a positive pressure which is higher than a current pressure in the valve-housing interior, wherein, by virtue of this positive pressure, the closure member assigned to said opening is raised up from the valve seat assigned to said opening and then, through this opening, pressure equalization is carried out between the valve-housing interior and the chamber assigned to said opening.

In contrast to the prior art mentioned, the invention proposes realizing pressure equalization no longer via separate bypass lines, but directly via the opening in the chamber, in that one of the chambers has generated in it a positive pressure which is large enough for the closure member assigned to said opening to be raised up from the valve seat assigned to said opening. Pressure equalization can then take place through the resulting overflow opening in the form of the open opening of the chamber. In contrast to the abovementioned prior art, bypass lines are thus no longer necessary for the invention since the positive pressure in the chamber is used to push open the closure member in order thus to allow pressure equalization.

Valves which can be operated by methods according to the invention can connect different numbers of openings of different numbers of chambers to one another and each have a corresponding number of closure members. It is advantageously the case that in each case one closure member is present for each chamber and for each opening in the chamber. It is thus advantageously the case that the valve, for closing the opening in each of the chambers, comprises at least one dedicated closure member. In a minimal variant, the valve is designed to connect one opening in one chamber to another opening in another chamber. In this case, the valve has a dedicated closure member for each opening, that is to say it has two closure members. Each closure member then serves for closing one of the openings. Since the valve, in this case, has two closure members, it may also be referred to, in this configuration, as a twin valve.

The method according to the invention may also be used, however, for operating valves configured in some other way. It is thus conceivable, for example, for the valve to connect more than two chambers to a respective opening and then, in accordance with the number of openings, also to have a corresponding number of closure members. Furthermore, it may, of course, also be the case that one chamber has more than one opening, in which case at least one closure member may then be provided for each opening or for each chamber.

It is possible for the valve seats assigned to the respective opening in the chamber to enclose the respective openings in the chambers directly or else also to be realized on openings in a valve housing surrounding the valve-housing interior, in which case the openings in the valve housing, in the fitted state, are made to coincide with the respective openings of the chambers or are fitted thereon. The openings in the chambers and possibly also in the valve housing are advantageously so-called transfer openings, through which components which are to be processed are guided. The cross section of said openings then follows, in principle, the size of the workpieces or components which are to be conveyed through the same. The cross-sectional surface areas of the openings may range, for example, from 90 cm$^2$ (square centimeters) to 25,000 cm$^2$, preferably from 3,000 cm$^2$ to 10,000 cm$^2$. Closure members which are suitable for this purpose may be configured, for example, in the form of valve plates. In the closed position, the closure members advantageously provide sealing between the chambers, or the interiors thereof, and the valve-housing interior. The seals which may be necessary for this purpose can be arranged both on the closure members and on the valve seats. Depending on the application and prevailing pressure conditions, use can be made of suitable seals from the prior art, without these having to be discussed here in detail once again. The valves operated by the method according to the invention may also be referred to as closure devices.

As already indicated in the introduction, methods according to the invention are preferably used in so-called vacuum technology. On account of being used in vacuum technology, the valves may also be referred to as vacuum valves. Vacuum technology is usually referred to whenever operating states with pressures lower than, or equal to, 0.001 millibars or 0.1 pascals are realized, at least temporarily.

In preferred configurations of the method according to the invention, it is provided that, in order for the closure member assigned to said opening to be raised up from the valve seat assigned to said opening, the positive pressure overcomes forces to which the closure member is subjected in the direction of the closed position by the longitudinal drive and by the current pressure in the valve-housing interior.

In particular when it is a question of using, in vacuum technology, methods according to the invention in preparation for maintaining, changing over and/or cleaning vacuum valves, it is advantageous if, prior to the positive pressure being generated, a pressure prevailing in each case in the valve-housing interior and in the chamber assigned to said opening is lower than atmospheric pressure and, for generating the positive pressure, atmospheric pressure is built up in the chamber assigned to said opening. Atmospheric pressure is understood in this case to be the ambient pressure present at the Earth's surface.

In particular when the gas composition and the pressure conditions in the other chamber are not to be influenced during and after the opening operation according to the invention, it is advantageously provided that, during the operation of opening the one of the openings, the closure member closing the at least one other opening of the at least one other chamber is pressed, by the longitudinal drive and/or by the pressure building up in the valve-housing interior, against the valve seat assigned to the other opening.

In order that the closure members, in a fully open position, provide as little obstruction as possible to the operation of the articles, workpieces or the like which are to be processed being guided through, methods according to the invention provide that the closure members can be moved between the respective closed position and a respective intermediate position by the at least one longitudinal drive and can be moved between the respective intermediate position and a fully open position in each case by at least one transverse drive, wherein the closure members, in the respective intermediate position, are raised up from the respective valve seat, but still arranged in a region between the openings and, in the respective fully open position, are moved, preferably in their entirety, out of the region between the openings. Valves in which the closure members carry out such movements are frequently also referred to as so-called L valves. The movement direction of the longitudinal drive is advantageously located along the transporting direction through the openings. The movement directions of the transverse drive are advantageous angled, preferably orthogonal, thereto.

In the case of methods according to the invention, it is particularly preferably provided that the closure member assigned to said opening is moved by the positive pressure, during the operation of being raised up from the valve seat enclosing said opening, from the closed position into the intermediate position. This is sufficient to allow pressure equalization between the valve-housing interior and the chamber assigned to said opening.

The closure members and the openings are advantageously located opposite one another. It is particularly preferred if the at least one longitudinal drive can move the closure members toward one another and away from one another. It is particularly preferably provided that the closure members can be moved independently of one another by at least one longitudinal drive or the longitudinal drives. It is thus, for example, possible for each closure member to be assigned a dedicated longitudinal drive. In this case, it is advantageous, however, if the longitudinal drives are arranged on a common longitudinal-drive carrier. This common longitudinal-drive carrier can then be moved, together with the longitudinal drives, for example by the transverse drive. In this case, the longitudinal drives are thus assigned a common transverse drive.

BRIEF DESCRIPTION OF THE DRAWINGS

Further features and details of preferred configurations of the method according to the invention will be explained with reference to the following description of the figures, in which.

DETAILED DESCRIPTION OF THE PREFERRED EMBODIMENTS

Figure 1:
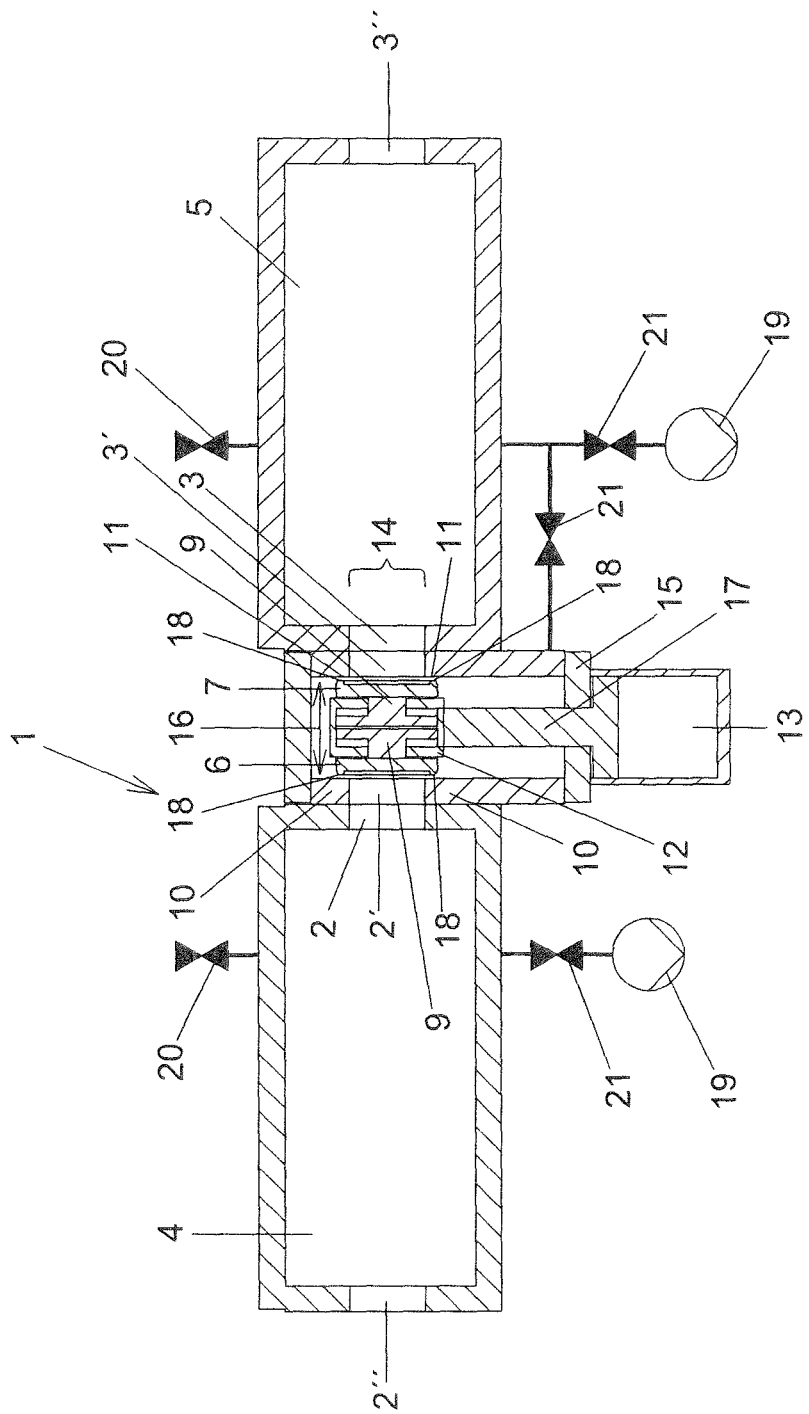
FIG. 1 shows a schematic illustration of two chambers connected by means of a valve.

FIG. 1, then, illustrates, in highly schematic form, two chambers 4 and 5 which are connected to one another by means of the valve 1. The two chambers 4 and 5 have openings 2 and 3. The valve 1 serves to connect the chambers 4 and 5, or the chamber volumes 4 and 5, to one another in the open state of the valve 1, and therefore components, workpieces and the like can be moved, through the openings 2 and 3 and the valve-housing interior 8, from the chamber 4 into the chamber 5, or vice versa. In the closed state, the valve 1 ensures that the openings 2 and 3 are closed and sealed on an individual basis or both together. A dedicated closure member 6 and 7 is respectively provided for each opening 2 and 3. The closure members here are designed as plates, or in plate form, in order to close, or free, the opening 2 and 3 respectively assigned to them. Sealing here takes place via the schematically depicted seals 18, by way of which the respective closure member 6 and 7 butts against the respective valve seat 10 and 11. In the exemplary embodiment shown here, the valve seat 10, which is assigned to the opening 2 of the chamber 4, is formed on the housing 15 of the valve 1. The valve seat 11, which is assigned to the opening 3 of the chamber 5, is likewise arranged on the valve housing 15. The valve seat 10 encloses the opening 2' in the valve housing 15. The opening 2' is made to coincide with the opening 2 of the chamber 4. The valve seat 11 encloses the opening 3' in the valve housing 15. The opening 3' is made to coincide with the opening 3 of the chamber 5. Of course, it would also be possible for the valve seat 10, which is assigned to the opening 2, to be formed directly on the corresponding wall of the chamber 4 and then to enclose the opening 2 directly. The same applies to the valve seat 11 and the opening 3. It would therefore also be possible for said valve seat 11 to be formed directly on the wall of the chamber 5 and to enclose the opening 3.

Figure 2:
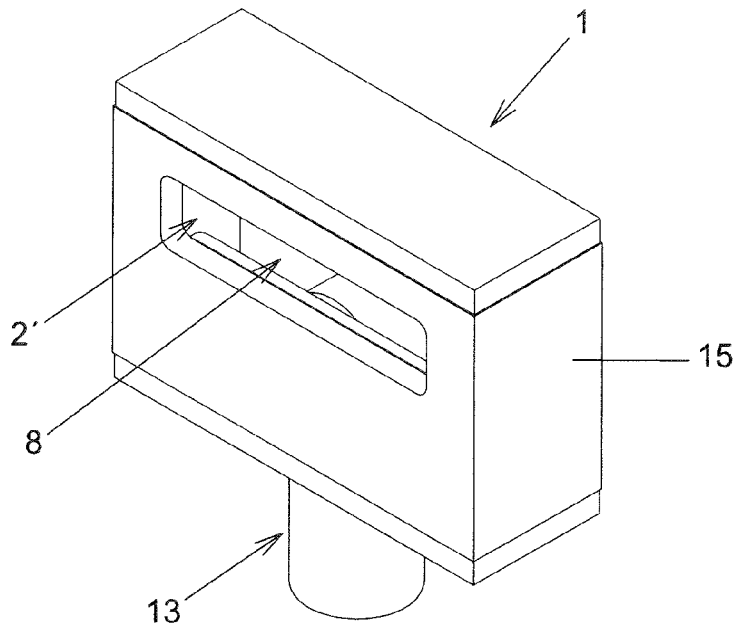
FIGS. 2 to 5 show schematic illustrations of details of the valve used in FIG. 1.
Figure 3:
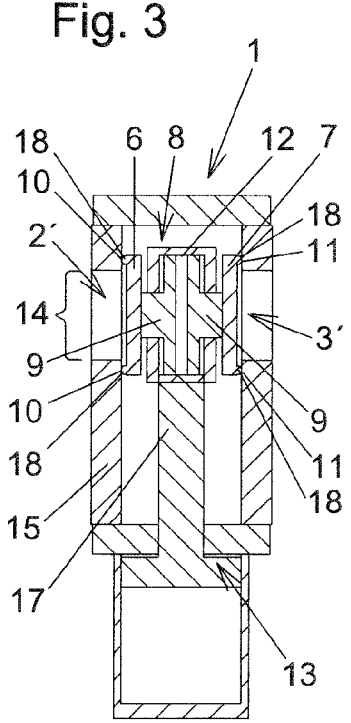
Figure 4:
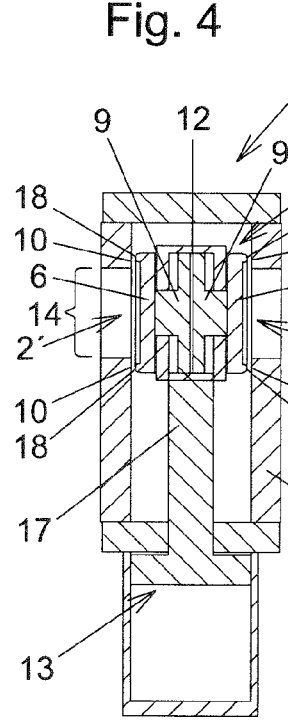
Figure 5:
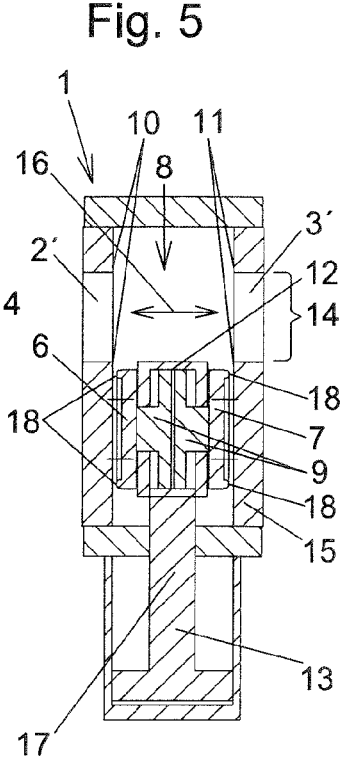

The longitudinal drives 9 realized here serve to move the closure members back and forth between the closed position and an intermediate position. This movement takes place parallel to the transporting direction 16. In the case of a valve 1 being opened to an appropriate extent, articles and gases can be transported in the transporting direction 16, through the valve-housing interior 8, from one chamber 4 or 5 to the other chamber 4 or 5. The longitudinal drives 9 here are realized in a common longitudinal-drive carrier 12. In the case of this exemplary embodiment, the closure members 6 and 7, together with the longitudinal drives 9 and longitudinal-drive carrier 12, are moved between the intermediate position and the fully open position, in a direction orthogonal to the transporting direction 16, by a transverse drive 13. FIGS. 3, 4 and 5 show longitudinal sections through the valve 1 in which the longitudinal drives 9 and the transverse drive 13, although always illustrated schematically, are nevertheless illustrated more precisely. As can be seen there, both the longitudinal drives 9 and the transverse drives 13 may be designed in the form of hydraulic or pneumatic pistons/cylinder arrangements. The supply and discharge lines for the hydraulics or pneumatics are not depicted here, but may be designed as in the prior art. The transverse drive 13 here, in this exemplary embodiment, acts on the longitudinal-drive carrier 12 by means of the rod 17. A respective longitudinal drive 9 is realized in the longitudinal-drive carrier 12 for each of the closure members 6 and 7. In the exemplary embodiment realized here, the longitudinal drive can be used to move the closure members 6 and 7 back and forth independently of one another between the closed position, which is illustrated in FIG. 3, and the intermediate position, which is illustrated in FIG. 4. These movements take place parallel to the transporting direction 16. FIG. 5 illustrates the fully open position, in which the transverse drive 13 has moved the longitudinal-drive carrier 12, and thus also the closure members 6 and 7, out of the region 14 between the openings 2 and 3 to such an extent that said region 14 is fully open and components or workpieces which are to be processed can be readily transported through the openings 2 and 3 and the valve housing 15 and the valve-housing interior 8. Purely for the sake of completeness, it should be pointed out that it is, of course, also possible for the longitudinal drives 9 and transverse drives 13 to be realized differently to those illustrated here, e.g. in the form of electric drives, spindle drives, toothed gear mechanisms, rack-and-pinion gear mechanisms and the like. FIG. 2 shows a perspective illustration of the valve 1 without the chambers 4 and 5.

It should also be pointed out in respect to FIG. 1, for the sake of completeness, that, in this schematic illustration, the additional openings 2" and 3" which are usually present, and through which workpieces which are to be processed or other articles can be introduced into the chambers 4 and 5 or removed therefrom, are illustrated here without corresponding valves or closure mechanisms. The openings 2" and 3" may be closable by further valves 1 or other kinds of closure devices known from the prior art. The construction which is shown here in all the figures can be realized, in principle, for a wide variety of different uses. It is particularly preferred, however, for such arrangements to be used in vacuum technology. In particular in vacuum technology, the two chambers 4 and 5, as shown in FIG. 1, are each assigned an air-admission valve 20. If this is opened, then atmospheric pressure can be established in the respective chamber 4 and/or 5 by virtue of air or other gases flowing at atmospheric pressure into the respective chamber 4 or 5. During normal operation, the chambers 4 and 5, and so too the valve-housing interior 8, are kept at a negative-pressure level below atmospheric pressure, in other words they are kept at so-called vacuum. In the exemplary embodiment shown, the pumps 19 are provided in order to be able to establish this vacuum. In the case of on/off valves 21 being switched appropriately, the pumps 19 can generate negative pressure in the chambers 4 and 5 and also in the valve-housing interior 8. For this purpose, the air-admission valves 20 are each in the closed state. In the exemplary embodiment shown in FIG. 1, there is no separate pump 19 provided for pumping out the valve-housing interior 8, and the valve-housing interior 8 has been connected directly, via the on/off valve 21, to the pump 19 which serves for pumping out the chamber 5. Appropriate positioning of the on/off valves 21 allows the valve-housing interior 8 and the chamber 5 to be pumped out simultaneously, but also separately from one another. There are numerous alternatives for this. It would be possible, for example, for a separate pump 19 to be assigned to the valve-housing interior 8. It would equally be possible, by appropriate connection to the valve-housing interior 8 via a corresponding on/off valve 21, also for the pump 19 assigned to the chamber 4 to be used for pumping out the valve-housing interior 8. In contrast to FIG. 1, it would also be possible, in addition, to do without a further pump, by virtue of the three on/off valves 21 being connected to a single one of the two pumps 19.

Since, then, the construction of the arrangement which has been shown here by way of example and is made up of two chambers 4 and 5 and a valve 1 arranged therebetween has been explained with reference to FIGS. 1 to 5, the method according to the invention for operating the valve will now be explained below by way of example on the basis of said arrangement. The explanation will proceed from a closed state according to FIG. 3, in which the two closure members 6 and 7 seal the respective openings 2 and 3 of the chambers 4 and 5. The sealing may be generated, for example, by the closure members 6 and 7 being pressed appropriately firmly against the valve seats 10 and 11 by the longitudinal drives 9. As an alternative, and in addition, it is also possible for sealing to take place by exertion of pressure by the pressure prevailing in the valve-housing interior 8 being correspondingly higher than that in the chambers 4 and 5. This can be achieved via the pumps 19 and appropriate positioning of the on/off valves 21. Vacuum technology is based on the pressures which prevail in these starting states in the chambers 4 and 5 and in the valve-housing interior 8 being lower than the atmospheric pressure prevailing outside. The openings 2" and 3" are also assumed to be closed and appropriately sealed.

If the intention, then, is for the method according to the invention to establish, for example, pressure equalization between the chamber 5 and the valve-housing interior 8 and, for this purpose, for the opening 3 of the chamber 5 to be opened in the direction of the valve-housing interior 8, then positive pressure is generated in the chamber 5 by virtue of the air-admission valve 20 being opened. As a result, the closure member 7 is then raised up from the valve seat 11 as soon as the positive pressure in the chamber 5 overcomes the forces to which the closure member 7 is subjected in the direction of the closed position by the longitudinal drive 9 and by the current pressure in the valve-housing interior 8. The positive pressure in the chamber 5 thus results in the closure member 7 opening, wherein said closure member is moved preferably into an intermediate position in which the closure member 7 still coincides with the region 14 of the opening 3. Pressure equalization between the chamber 5 and the valve-housing interior 8 then takes place in this position. If, in preferred configurations, the positive pressure in the chamber 5 is brought to atmospheric pressure, then it is also thus possible to generate atmospheric pressure in the valve-housing interior 8. This can be utilized, for example, in order to perform on the valve 1 cleaning, maintenance or other service work for which the valve 1 has to be opened, in order for the corresponding work to be carried out, once the valve-housing interior 8 has been brought to atmospheric pressure, according to the invention, via the chamber 5.

During this type of operation according to the invention of raising up the closure member 7 from the valve seat 11 by means of positive pressure in the chamber 5, and the resulting pressure equalization between the chamber 5 and the valve-housing interior 8, it is possible for the closure member 6, which closes the other opening 2 of the other chamber 4, to remain pressed against the valve seat 10. The exertion of pressure takes place by way of the longitudinal drive 9 and/or by way of the pressure building up in the valve-housing interior 8.

In contrast to the pressure equalization outlined here by way of example between the chamber 5 and the valve-housing interior 8, it is, of course, also possible according to the invention to achieve pressure equalization between the chamber 4 and the valve-housing interior 8 in an analogous manner by the closure member 6 being raised up from the valve seat 10 correspondingly by means of positive pressure in the chamber 4. Furthermore, it is, of course, also possible for the process outlined to take place at quite different pressure levels. It is not necessary, of course, for the positive pressure to be equal, in principle, to atmospheric pressure. The positive pressure may also be above or below atmospheric pressure. If appropriate, it is necessary to use a corresponding pump (not depicted here) for building up a corresponding positive pressure in the chambers 4 or 5.

Figure 6:
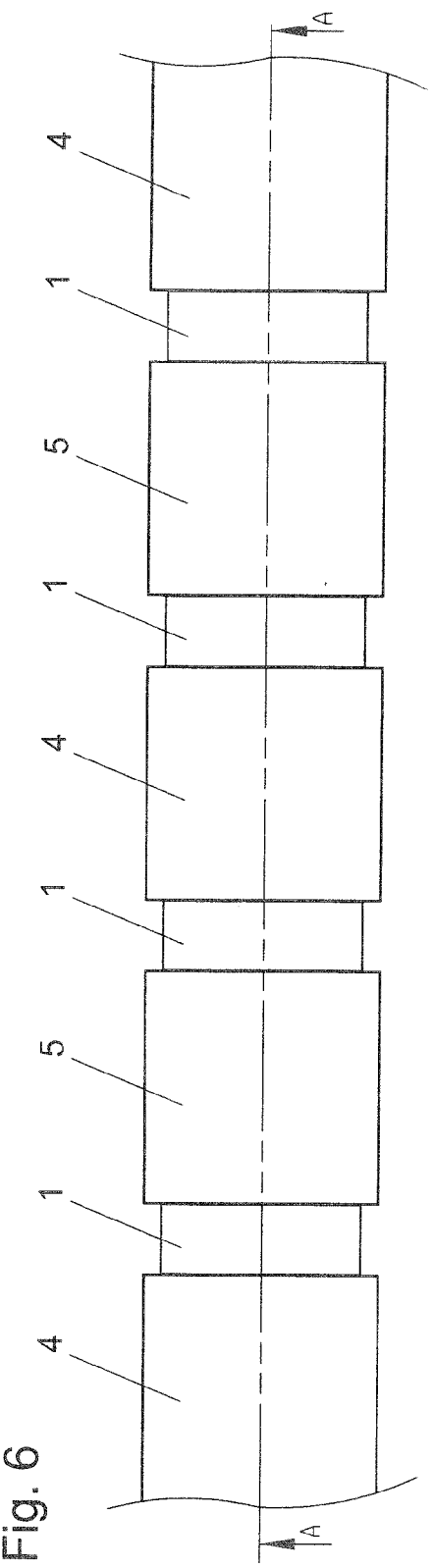
FIG. 6 shows a schematic illustration of a plurality of chambers which are arranged one behind the other in a row and are connected to one another in each case by means of a valve.
Figure 7:
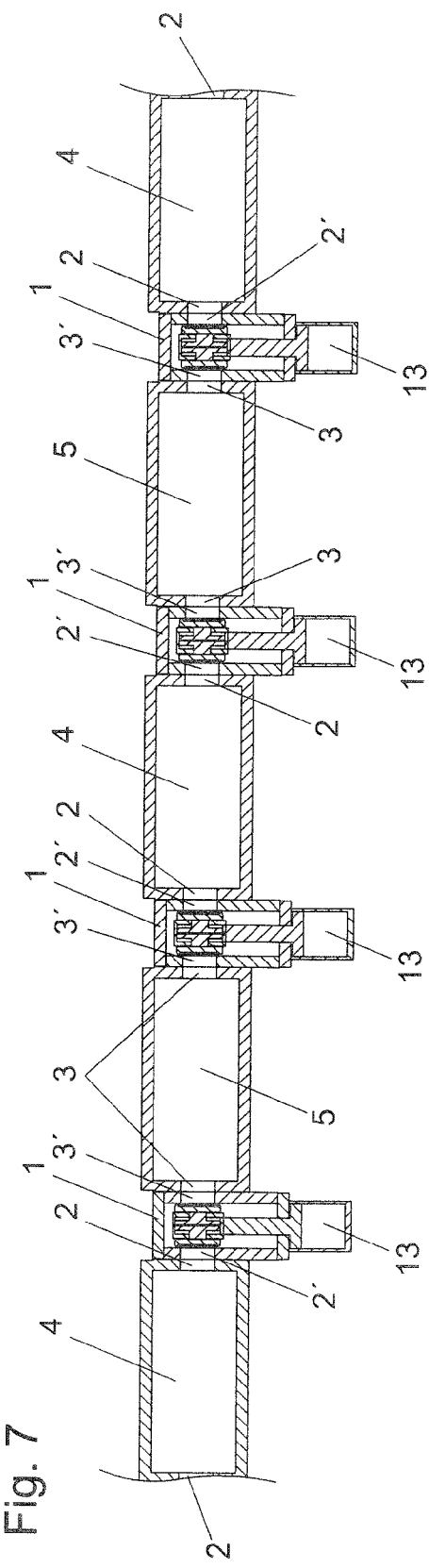
FIG. 7 shows the longitudinal section along section line A-A from FIG. 6.
Figure 8:
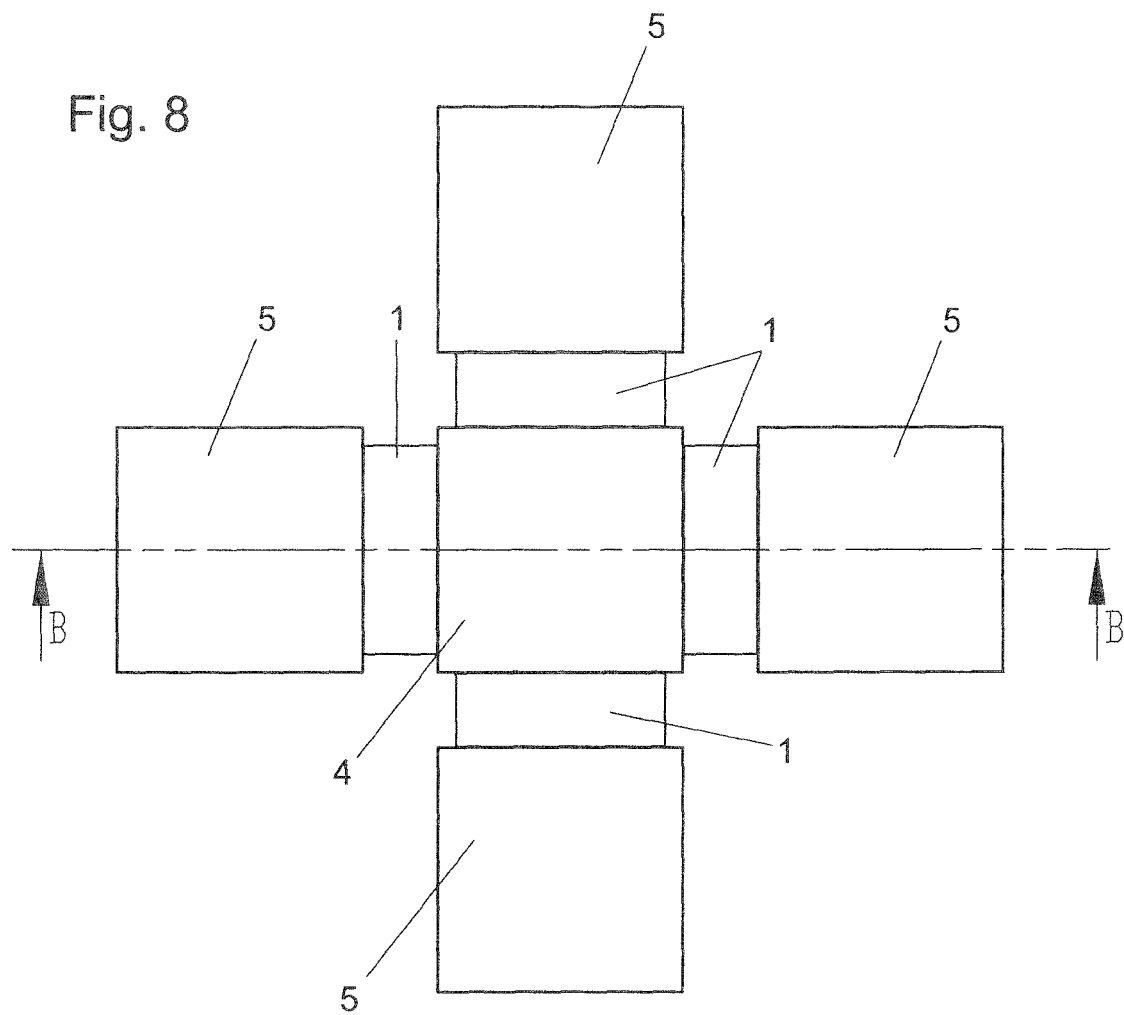
FIG. 8 shows a plurality of chambers which are arranged in a cross-shaped manner and are connected to one another by means of valves and a central transfer chamber.
Figure 9:
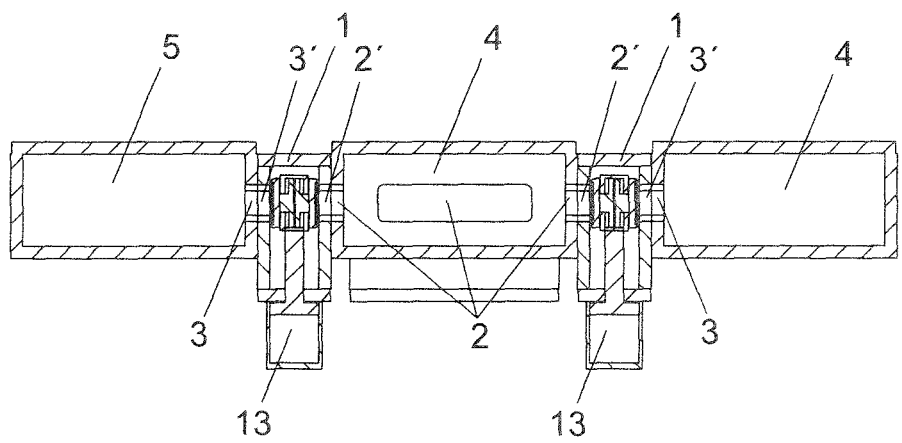
FIG. 9 shows a sectional illustration along section line B-B from FIG. 8.

FIG. 6 shows a row of process chambers 4 and 5 arranged one behind the other and each connected via a valve 1. The valves 1 correspond to the previously outlined exemplary embodiment according to FIGS. 1 to 5. FIG. 7 shows a longitudinal section along section line A-A through this succession of valves and chambers. The method according to the invention can be used for each of the valves 1. FIG. 8 also shows a star-shaped arrangement of the chambers 4 and 5. These too are connected to one another by means of corresponding valves 1 of the type shown in FIG. 8. FIG. 9 shows the section along section line B-B. It is also the case that the valves 1 in this exemplary embodiment can be operated in the manner according to the invention.

Finally, for the sake of completeness, it should be pointed out that the pumps 19, air-admission valves 20 and on/off valves 21 are not illustrated in FIGS. 2 to 9. This is purely for the purpose of simplifying illustration. The pumps 19, air-admission valves 20 and on/off valves 21 not illustrated in said figures may be realized like those in FIG. 1 or also in some other suitable way.

KEY TO THE REFERENCE NUMERALS

1 Valve
2, 2', 2" Opening
3, 3', 3" Opening
4 Chamber
5 Chamber
6 Closure member
7 Closure member
8 Valve-housing interior
9 Longitudinal drive
10 Valve seat
11 Valve seat
12 Longitudinal-drive carrier
13 Transverse drive
14 Region
15 Valve housing
16 Transporting direction
17 Rod
18 Seal
19 Pump
20 Air-admission valve
21 On/off valve

The invention claimed is:

1. A method of operating a valve which connects openings of at least two chambers to one another and, for closing the openings of each of the chambers, has at least one dedicated closure member, the method comprising:
for closing the openings in a closed position in a housing interior of the valve, pressing closure members by at least one longitudinal drive of the valve against valve seats, each assigned to the openings; and
for opening one of the openings, generating a positive pressure in the chamber assigned to said opening that is higher than a current pressure in a valve-housing interior, raising, via said positive pressure, the closure member assigned to said opening up from the valve seat assigned to said opening and then, through the opening, carrying out a pressure equalization between the valve-housing interior and the chamber assigned to said opening.

2. The method according to claim 1, wherein, in order for the closure member assigned to said opening to be raised up from the valve seat assigned to said opening, the positive pressure overcomes forces to which the closure member is subjected in a direction of the closed position by the longitudinal drive and by a current pressure in the valve-housing interior.

3. The method according to claim 1, further comprising, during the operation of opening the one of the openings, pressing the closure member closing the at least one other opening of the at least one other chamber by at least one of the longitudinal drive or by the pressure building up in the valve-housing interior, against the valve seat assigned to the other opening.

4. The method according to claim 1, wherein, prior to the positive pressure being generated, a pressure prevailing in each case in the valve-housing interior and in the chamber assigned to said opening is lower than atmospheric pressure and, for generating the positive pressure the method further comprises building up atmospheric pressure in the chamber assigned to said opening.

5. The method according to claim 1, wherein the at least one longitudinal drive moves the closure members toward one another and away from one another.

6. The method according to claim 1, wherein the closure members are movable independently of one another by at least one longitudinal drive.

7. The method according to claim 1, wherein each of the closure members is assigned a dedicated one of the longitudinal drives of the valve, and the longitudinal drives are arranged on a common longitudinal-drive carrier.

8. The method according to claim 1, wherein the closure members are movable between the respective closed position and at least one respective intermediate position by the at least one longitudinal drive and are movable between the respective intermediate position and a fully open position in each case by at least one transverse drive, the method further comprising raising the closure members, in the respective intermediate position, up from the respective valve seat, and maintaining the closure members arranged in a region between the openings and, moving the closure members, in the respective fully open position, outside of the region between the openings.

9. The method according to claim 8, wherein the closure member assigned to said opening is moved by said positive pressure, during the operation of being raised up from the valve seat assigned to said opening, from the closed position into the intermediate position.

* * * * *